Feb. 26, 1924. 1,484,745
H. L. WADSWORTH
APPARATUS FOR PURIFYING GASES
Filed March 24, 1917   2 Sheets-Sheet 2
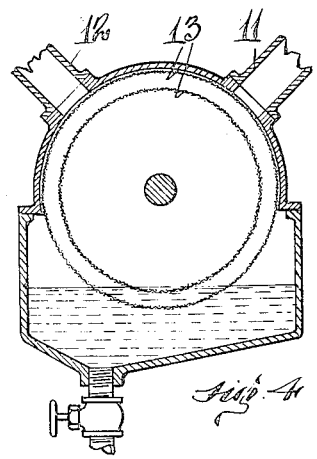
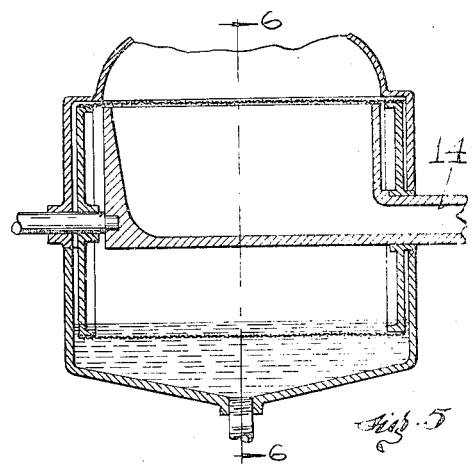
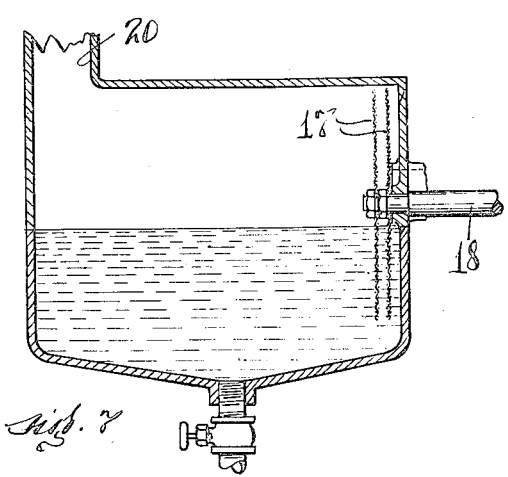
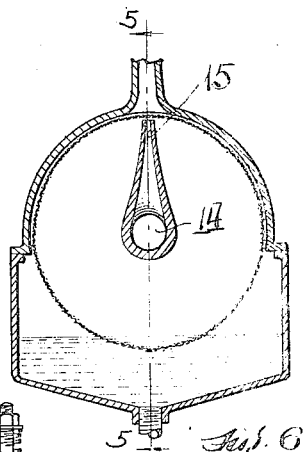
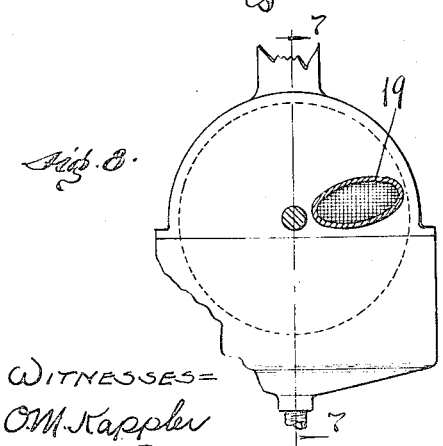
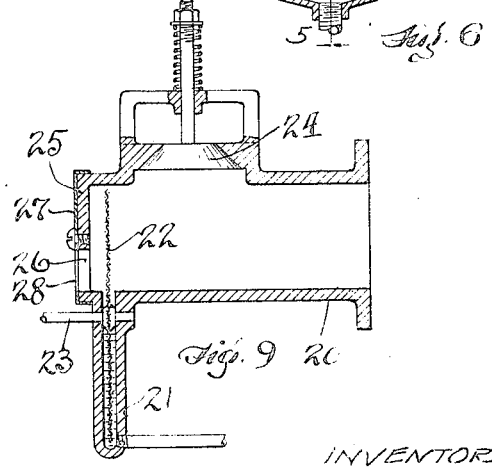
WITNESSES:
O. M. Kappler
Thos. H. Fay
INVENTOR
Howard L. Wadsworth
By Fay, Oberlin & Fay ATTYS Patented Feb. 26, 1924.

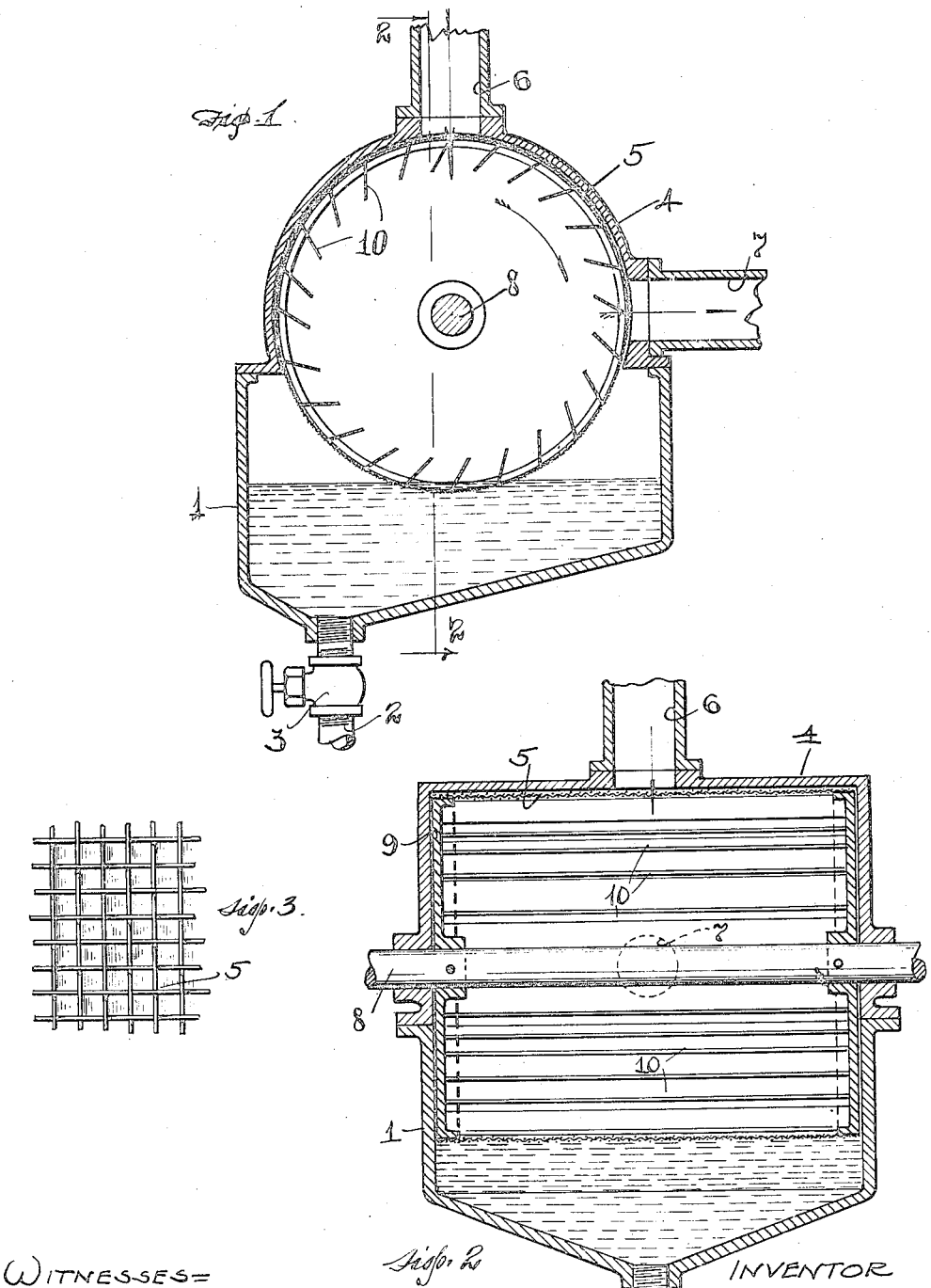

1,484,745

UNITED STATES PATENT OFFICE.

HOWARD L. WADSWORTH, OF CLEVELAND, OHIO.

APPARATUS FOR PURIFYING GASES.

Application filed March 24, 1917. Serial No. 157,286.

*To all whom it may concern:*

Be it known that I, HOWARD L. WADSWORTH, a citizen of the United States, and a resident of Cleveland, county of Cuyahoga, and State of Ohio, have invented a new and useful Improvement in Apparatus for Purifying Gases, of which the following is a specification, the principle of the invention being herein explained and the best mode in which I have contemplated applying that principle, so as to distinguish it from other inventions.

The present invention relates to an apparatus for bringing together liquid and vapor in intimate contact for various purposes, such for example as to cause some physical or chemical action to take place between the gas and the liquid, or to vaporize the liquid, condense the gas into a liquid in case the gas is a vapor proper, or for removing impurities or other matter from the gas or vapor. As used above, the word "vapor" is intended to signify either a vapor proper or a permanent gas, and will be so used throughout the specification and claim. In the following description certain applications of my invention are given, although it will be at once recognized that other uses for the invention will readily suggest themselves to those skilled in the various arts.

The annexed drawings and the following description set forth in detail certain means and one mode of carrying out the invention, such disclosed means and mode illustrating, however, but one of various ways in which the principle of the invention may be used.

In said annexed drawings:—

Figure 1 is a transverse vertical section through one form of an apparatus adapted for carrying out my improved method; Figure 2 is a longitudinal section through the device shown in Figure 1, the plane of the section being indicated by the line 2—2 in Figure 1; Figure 3 is a plan view on an enlarged scale of a small section of a fine mesh screen which may be used in the apparatus of Figures 1 and 2; Figure 4 is a view simliar to Figure 1 showing a modification of such apparatus; Figure 5 is a longitudinal vertical section through still another modification; Figure 6 is a transverse section on the line 6—6 in Figure 5; Figure 7 is a longitudinal section through another modified form; Figure 8 is a view of the right end of the apparatus shown in Figure 7; and Figure 9 is a longitudinal vertical section through a device illustrating an adaptation of my invention to the carburetion of air.

My improved method briefly stated, consists in passing a current of vapor over or against a thin film of liquid for the purpose of producing a physical or chemical action between the two or between the liquid and some material carried in suspension by the vapor. The subsequent treatment of the materials will depend upon the nature of this action which will in turn depend upon the gas and liquid used and upon the material, if any, that is carried in suspension as will be pointed out more fully hereinafter. It will, of course, be recognized that it may be necessary or desirable in some cases to employ the method several times to secure some desired chemical action.

The method can best be described in connection with the apparatus for carrying them out, although it is obviously not limited to use with such apparatus, and hence, referring to Figure 1, I have shown a suitable chamber 1 adapted to contain liquid to the level shown and provided with a drain conduit 2 normally closed by means of a suitable valve 3. This liquid containing chamber is provided with a suitable top or cover 4 formed to snugly fit about a rotatably mounted screen 5, preferably of cylindrical form, which is so mounted as to dip into the liquid contained in the chamber. The cover 5 of the chamber is provided with an inlet opening or conduit 6, through which vapor may be blown into the chamber, and with a lateral discharge opening 7. Any suitable means may be of coures used for rotating the shaft 8 to which the screen is attached by being shrunk onto the disks 9 attached to the shaft, or if desired suitably positioned blades 10 may be employed for the purpose of allowing the incoming air to rotate the screen, as will be readily understood from an inspection of Figure 1. The apparatus shown in Figures 1 and 2 is designed for removing the dust carried in suspension in air, which will be accomplished by the air striking the screen as it enters the chamber, the screen rotating in the direction of the arrows and having a film of the liquid in the meshes thereof. The screen is rotated at such a speed that all of the air entering the conduit 6 is caused to strike a film of liquid, so that all of the dust contained in the air strikes this film and is caused to form small balls or drops of matter held together by the moisture of the film, these drops depositing in the liquid while the purified air is permitted to escape through the outlet 7. The proportions of liquid and vapor used will depend upon whether it is desired to vaporize the liquid or to collect it in association with material, such as dust for example, carried in suspension by the vapor and on this point will depend the volume and speed of the vapor supplied and the fineness of mesh and speed of movement of the liquid film bearing member.

In Figure 3 I have shown an enlarged view of a portion of the screen showing a film of liquid thereon, the liquid being preferably water, for collecting the dust or dirt from air, although other suitable liquid, such as oil, might be employed. The choice of the particular liquid used will, of course, be governed by the end to be accomplished in each case and if some chemical reaction is desired for the vapor, or material carried thereby, then an appropriate liquid must be employed for the purpose. Thus, in collecting acid fumes it would be desirable to use some alkaline solution in the chamber for securing the retention of the fumes in the form of a salt.

In Figure 4 I have shown a modified form of the apparatus in which the inlet and outlet conduits 11 and 12 are disposed at an angle of approximately forty-five degrees to the vertical, and at about ninety degrees to each other. It is desirable, in collecting dust and dirt out of air, or in collecting any depositing material out of a vapor, to have the incoming blast of vapor directed toward the surface of the liquid, so that the drops of matter which are formed will tend to fall into the liquid rather than to be blown into the discharge conduit, and the constructions in Figures 1 and 4 both effect this result. Conversely, it may be desirable in vaporizing the liquid film to direct the column of vapor against it at an angle other than a right angle or to pass the vapor tangentially against or across the film of liquid, although this is not always necessary.

In Figure 4 I have also shown a series of the screens 13, the exact number being determined by the amount of material which must be collected out of the vapor, and the difficulty in collecting it.

In Figures 5 and 6 I have illustrated an apparatus designed for humidifying air or for vaporizing a liquid by mixing the same with another vapor or gas, and accordingly an inlet conduit 14 is provided entering the chamber through one side or end and extending to the screen in the form of an elongated slot or opening 15. In order to prevent the incoming vapor from contacting the surface of the liquid in the chamber, the conduit 14 is formed without openings except the discharge opening against the screen, and in this way the amount of liquid may be proportioned to the vapor by the speed at which the screen is driven, or by varying the velocity of the vapor.

In Figures 7 and 8 still another form of the apparatus is illustrated, and in this form I have shown a plurality of disk screens 17 mounted adjacent to one end or side of the chamber on a shaft 18 which may be rotated by any suitable means, these screens passing before a sector-shaped inlet opening 19, and the chamber being provided with a discharge passage 20 at the other end of the casing.

In Figure 9 I have shown the invention as applied to the vaporization of liquid fuels such as gasoline and the like. The apparatus illustrated for this purpose comprises a casing 20 having a well 21 for the fuel into which there extends a disk screen 22 fixed to a shaft 23 which may be driven by any suitable means, although preferably rotated by some moving part of the internal combustion engine to which the present apparatus will be applied. The speed of rotation of the shaft will preferably be varied with the variations in the engine speed.

The casing 20 is open at one end for connection to the manifold of an engine and an auxiliary air valve 24 of suitable type is provided between the screen 22 and the open end of the chamber. The other end of this chamber is closed by a wall 25 having an opening 26 therein for the admission of air and the size of this opening is controlled by a disk 27 adjustably mounted on the wall 25 and provided with a hole 28 which may be brought into registration with the opening 26 or may partially cover this opening to admit various amounts of air.

The rotating screen 22 will collect a film of liquid from its passage through the well 21 and this film will be vaporized by the incoming air.

It will be evident from the foregoing description of my invention that it provides an extremely simple and effective method of bringing together in an intimate association, a vapor and a liquid and numerous uses and applications of this method, other than those already mentioned will readily suggest themselves to those skilled in the various arts.

I therefore particularly point out and distinctly claim as my invention:—

In an apparatus of the character described, the combination of a liquid containing chamber, a horizontal shaft extending into said chamber a short distance adjacent one end thereof, a disk screen mounted on said shaft and rotatable in a vertical position adjacent said end wall of the chamber, the remainder of the chamber being wholly unobstructed, an intake opening for air in the upper half of said end of said chamber and above the liquid level thereof, whereby said air will contact with liquid adhering to the upper portion of said disk, and means for discharging the liquid impregnated air after it has traversed the full unobstructed portion of said chamber.

Signed by me, this 7th day of December, 1916.

HOWARD L. WADSWORTH.